(12) United States Patent
Borneman et al.

(10) Patent No.: US 6,553,041 B1
(45) Date of Patent: Apr. 22, 2003

(54) METHOD, APPARATUS AND SYSTEM FOR MITIGATING IN-BAND SIGNALING NOISE

(75) Inventors: Jeffrey L. Borneman, Lombard, IL (US); Phillip Kent Freyman, Elgin, IL (US); Andrew J. Mansen, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/298,774

(22) Filed: Apr. 22, 1999

(51) Int. Cl.[7] .................................................. H04J 3/12
(52) U.S. Cl. ...................................................... 370/522
(58) Field of Search ................................. 370/522–524, 370/395–399; 317/323, 358–363, 498–509, 515, 210, 206, 535–538; 379/228–231, 399; 375/222–224; 346/230–234, 260–265, 367, 138; 703/21; 455/562, 550

(56) References Cited

U.S. PATENT DOCUMENTS

| | | | | | |
|---|---|---|---|---|---|
| 5,881,148 | A | * | 3/1999 | Koening et al. | 379/399 |
| 6,002,713 | A | * | 12/1999 | Goldstein et al. | 375/222 |
| 6,115,395 | A | * | 9/2000 | Norrell et al. | 370/523 |
| 6,195,425 | B1 | * | 2/2001 | Farris | 379/230 |
| 6,404,830 | B2 | * | 6/2002 | Wise et al. | 375/346 |

* cited by examiner

*Primary Examiner*—Kwang Bin Yao
*Assistant Examiner*—Prenell Jones
(74) *Attorney, Agent, or Firm*—Terri S. Hughes; Hisashi D. Watanabe

(57) ABSTRACT

A network element (14) receives a traffic data stream having an embedded in-band signaling pattern. The network element (14) synchronizes to the traffic data stream and detects the location of the in-band signaling pattern. The network element (14) then replaces the in-band signaling pattern with a noise-mitigating signaling pattern.

35 Claims, 8 Drawing Sheets

METHOD, APPARATUS AND SYSTEM FOR MITIGATING IN-BAND SIGNALING NOISE

FIELD OF THE INVENTION

The present invention relates generally to a method, apparatus and system for mitigating in-band signaling noise, such as robbed-bit signaling noise.

BACKGROUND OF THE INVENTION

Telephony network architectures allow for the possibility of multiple paths between end users which may incorporate one or more digital trunk links (Bellcore TR 008 and GR 303 compliant interface standards) which may use in-band signaling, such as robbed-bit signaling (RBS) for call supervision or management.

New network architectures (hybrid fiber coaxial cable (HFC) access, digital loop carrier (DLC) access, wide area network (WAN) access, voice over internet protocol (VoIP) access, etc.) add to the possibility of in-band signaling links by placing remote terminal access nodes in close proximity to service locations. Some of these remote access network nodes also utilize digital trunk links to back haul the local access node traffic to a central office switch. Some of these trunk links also utilize in-band signaling.

In-band signaling, such as RBS, removes informational content from the least significant bit of every sixth pulse code modulated (PCM) sample from a 64 kilobits-per-second (kbps) traffic channel and replaces it with network signaling information. This RBS network signaling information is only used by the network and therefore, represents errors to the traffic channel. This network signaling therefore represents informational errors or "noise" (RBS noise pattern).

Some modems detect in-band signaling as degradation in the signal-to-noise ratio (SNR) in a 64 kbps traffic channel and step down the transmission rate to compensate for the SNR degradation. Newer modems utilize a unique communication protocol (ITU-T V.90) in the downstream path (from local digital switch to subscriber premises) which utilizes digital channel coding in the PCM domain. The RBS affect on these modems is more significant in that the RBS corrupts the digital channel coding which results in a greater impact on the transmission rate and the block error rate (BLER) than simple SNR degradation.

While some of these modems are capable of detecting the affects of RBS and can alter the channel coding to optimize the transmission rate and minimize the BLER degradation, other modems are unable to detect the RBS and fail to adapt the channel coding to compensate.

Thus, there exists a need for a method, apparatus and system for mitigating in-band signaling noise.

BRIEF DESCRIPTION OF THE DRAWINGS

A preferred embodiment of the invention is now described, by way of example only, with reference to the accompanying drawings in which.

DETAILED DESCRIPTION OF THE PREFERRED EMBODIMENTS

Figure 1:
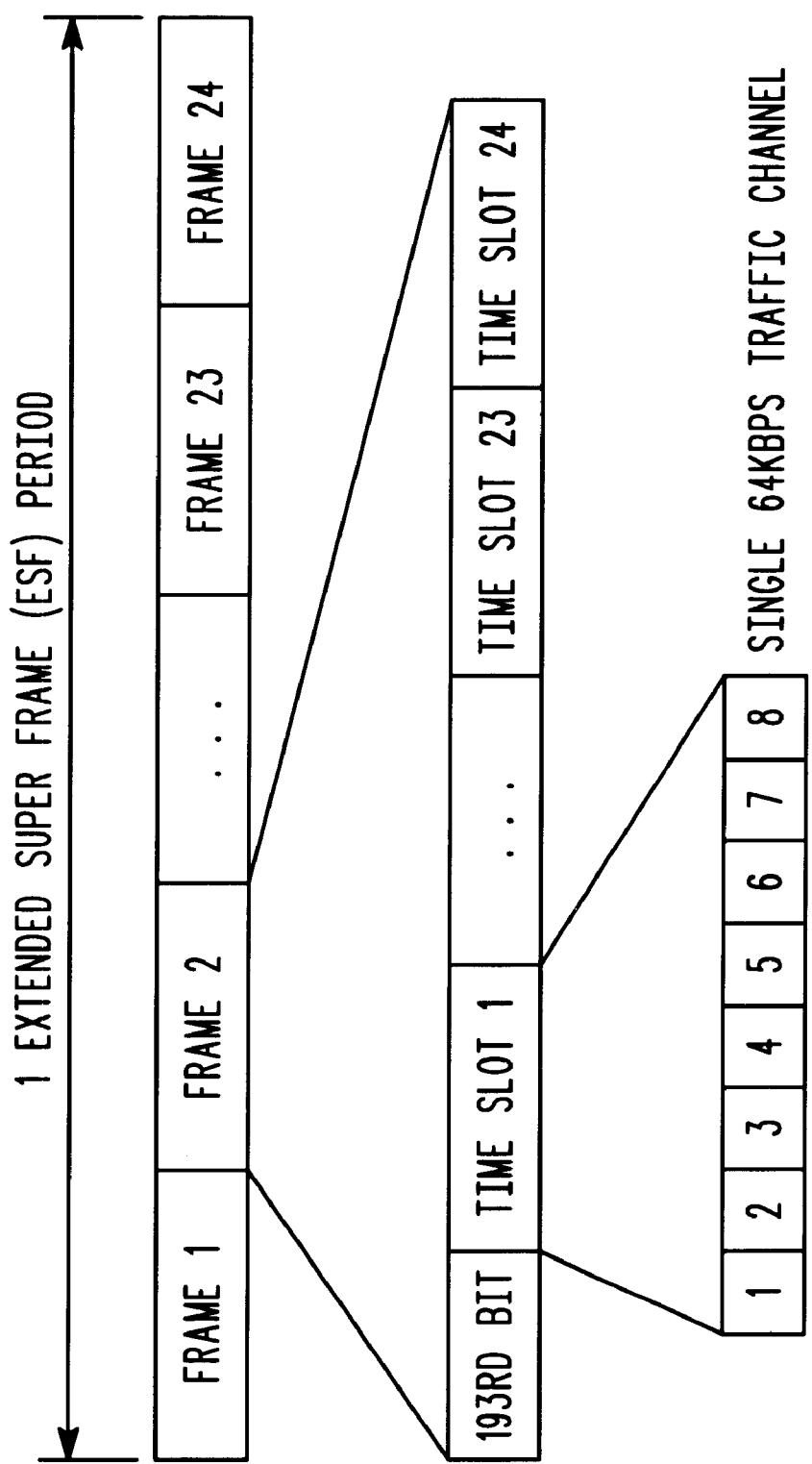
FIG. 1 illustrates a T1 frame structure in an extended superframe format (ESF) format.

As illustrated in FIG. 1, twenty-four 64 kilo-bits-per-second (kbps) traffic channels (also referred to as a traffic data stream) are typically grouped together into a T1 link format. A basic T1 link format consists of 193-bits of information or one T1 frame. For ease of explanation, the present invention is discussed in terms of transmitting and receiving an individual 64 kbps traffic channel/traffic data stream and a T1 frame/T1 framing structure.

The preferred embodiment of the present invention is described in a telephony network, however, the present invention can be utilized in any network environment where in-band signaling is present. For ease of explanation, the following discussion will focus on a telephony network.

In a telephony network, when a telephony network element passes in-band signaling patterns downstream (such as from a local digital switch (LDS) to a subscriber premises) without signaling noise mitigating, then the in-band signaling noise patterns which vary in time appear to the subscriber modem as non-deterministic bit errors. If, however, a telephony network element replaces the in-band signaling noise patterns with a steady-state noise mitigating signaling pattern (e.g., all ones, all zeros or any other noise mitigating pattern which improves the communications protocol transfer characteristics as measured by the subscriber modem) then the in-band signaling noise patterns appear to the subscriber modem as a deterministic digital impairment that is easily detected during the modem training process. Such detection allows the subscriber modem to adapt or alter the channel coding or channel recovery algorithm to ignore the in-band signaling impairment and provide the maximum speed and highest reliable connection possible. By performing this in-band signaling replacement, the quality-of-service provided to the general population is improved across most versions of subscriber modem families.

Figure 2:
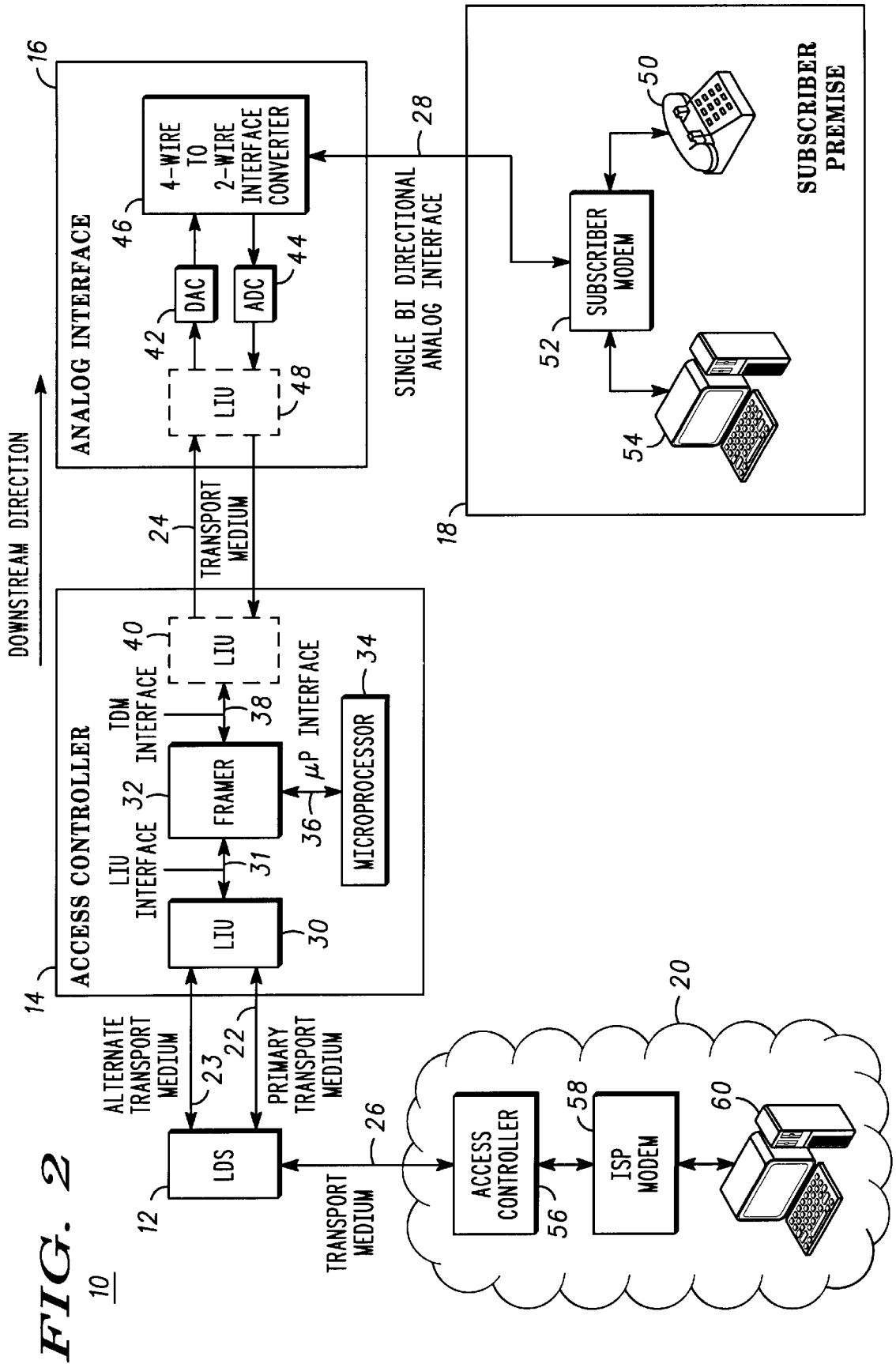
FIG. 2 illustrates a circuit-switched telephony network according to the preferred embodiment of the present invention.

FIG. 2 illustrates a circuit-switched telephony network according to the preferred embodiment of the present invention. Circuit-switching is a type of communications in which a dedicated channel or circuit is established for the duration of a transmission. The telephony network 10 of FIG. 2 comprises the following telephony network elements: a LDS 12, an access controller 14, an analog interface 16, a subscriber premises 18 and a high-speed access interface point 20. The telephony network elements are coupled together via a plurality of transport mediums 22, 24, 26.

The LDS 12 connects incoming lines or trunks to outgoing lines or trunks as part of an end-to-end modem connection, wherein a line is a bi-directional communication path between a switch and multiple end-users and a trunk is a communication path between two LDSs. The LDS 12 makes dedicated 64 kbps channel connections for the duration of a telephone call. The LDS 12 typically includes internal fabric, a routing table, signaling capabilities and software (none of which are shown in the figures). The internal fabric provides a physical layer (Layer 1) port-to-port connectivity. The routing table, based on a called telephone number, identifies which cross-switch connection is required. A cross-switch makes bi-directional steady-state 64 kbps traffic channel (also referred to as a traffic data stream) connections in the digital domain and is steady-state for the duration of a telephone call. The signaling capability, such as the Bellcore GR-303 compliant interface protocol or the Bellcore TR-008 compliant interface protocol, communicates with other switches or subscriber equipment. The software supports telephone calls associated services.

The access controller 14 is also referred to in the telephony industry as a digital loop carrier, an integrated digital loop carrier, or a gateway. The access controller 14 communicates with the LDS 12 to provide 64 kbps connections over the transport medium 22. The transport medium 22 is a digital-type connection. The physical layer (Layer 1) interface of the transport medium can be, but not limited to, a wireless interface, a coaxial cable interface, a metallic interface, or a fiber optic interface.

The access controller 14 comprises a line interface unit (LIU) 30, a framer 32 and a microprocessor 34. The functions of the LIU 30 and the framer 32 can either be implemented as discrete hardware components, integrated together as a single multi-functional device, or combined with the microprocessor 34 (or a digital signaling processor ((DSP) not shown)), such as integrated peripherals to the microprocessor 34/DSP as known in the art.

The LIU 30 is coupled to the LDS 12 via the transport medium 22. The LIU 30 is a physical Layer 1 line interface capable of operation at the physical Layer 1 carrier rates. Typically, the LIU 30 contains an integrated line transceiver (not shown) that simultaneously transmits and receives information to and/or from the transport medium 22. Further, the LIU 30 provides synchronized loop clock recovery and data re-timing on received data in the "downstream" direction. For purposes of this description, the "downstream" direction is defined as information flowing away from the LDS 12. In the "upstream" direction, the LIU 30 transmits waveforms to the LDS 12 compatible with the transport medium 22. For purposes of this description, the "upstream" direction is defined as information flowing to the LDS 12.

The framer 32 is coupled to the LIU 30. In the downstream direction, the framer 32 decodes in-band signaling patterns received from the LIU 30 and makes these patterns available to the microprocessor 34 via a microprocessor interface 36. The framer 32 also decodes 64 kbps traffic channel information that it receives from the LIU interface 31 and presents the 64 kbps traffic channel information to a time division multiplexing (TDM) interface 38 (also referred to as a concentration highway interface) for further traffic routing to the analog interface 16. In the upstream direction, the framer 32 encodes the 64 kbps traffic channel information received from the TDM interface 38 and presents it to the LIU 30.

The microprocessor 34 is coupled to the framer 32 and uses the decoded in-band signaling pattern state information to provide call supervision functions and routing between the LDS 12 and the access controller 14 across the transport medium 22 and between the access controller 14 and the analog interface 16 across transport medium 24. This includes the decoding and transmission of in-band signaling pattern traffic channel states (e.g., on-hook, off-hook, ring on, ring-off, etc.). The microprocessor 34 can also be referred to as a generic controller that is implemented by an external computer or discrete hardware. For the GR-303 compliant interface protocol, these functions are most likely implemented in a microprocessor or a computer. For the TR-008 compliant interface standard, these functions are most likely implemented in simple hardware.

The access controller 14 optionally uses a second LIU 40 that is coupled to the TDM interface 38. In the downstream direction, the second LIU 40 transmits waveforms compatible with the transport medium 24 to the analog interface 16. In the upstream direction, the second LIU 40 provides synchronized loop clock recovery and data re-timing on received upstream data.

The analog interface 16 comprises a digital-to-analog converter (DAC) 42, an analog-to-digital converter (ADC) and a four-wire to two-wire interface converter 46. In the downstream direction, the DAC 42 converts a digital 64 kbps traffic channel information to a continuous analog voltage that it presents to the four-wire to two-wire interface converter 46. In the upstream direction, the ADC 44 converts analog voltage received from the four-wire to two-wire interface converter 46 to 64 kbps traffic channel information. The four-wire to two-wire interface converter 46 transforms the independent analog downstream and upstream interfaces to a single bi-directional analog interface 28 that connects to the subscriber premises 18.

The analog interface 16 optionally uses a LIU 48 to interface with the transport medium 24 between the access controller 14 and the analog interface 16. In the downstream direction, the LIU 48 provides synchronized loop clock recovery and data re-timing on received downstream data. In the upstream direction, the LIU 48 transmits waveforms compatible with the transport medium 24 to the access controller 14.

The subscriber premises 18 is preferably a fixed location (e.g., a home, an office building, or any other location and/or thing that is accessed via a wire-lined connection), but can easily be a non-fixed location (e.g., an automobile, an airplane, a laptop computer, a personal digital assistant (pda) or any other location and/or thing that is accessed via a wireless connection). The subscriber premises 18 comprises a telephone 50, a subscriber modem 52 and a computer 54. In the downstream direction, the subscriber modem 52 converts v.34, v.34+, v.42, v.90, or any other applicable communications protocol information carried over the single bi-directional analog interface 28 to digital computer information. The digital computer information is then read and processed by the computer 54. In the upstream direction, the subscriber modem 52 converts the digital computer information to v.34, v.34+, v.42, v.90, or any other applicable communications protocol information.

The high-speed access interface point 20 (such as an internet service provider (ISP) and hereinafter referred to as the ISP for purposes of this description), is coupled to the LDS 12. The transport medium 26 between the ISP 20 and the LDS 12 may have the same type of physical layer (Layer 1) interface as the transport medium 22 between the LDS 12 and the access controller 14 and therefore may invoke its own in-band signaling noise in the network. The ISP 20 is capable of providing and sustaining high-speed communication protocols with the subscriber modem 52. These communication protocols may consist of v.34, v.34+, v.42, v.90 or any other applicable standard protocols. The ISP 20 comprises an access controller 56, a high-speed access interface modem 58 (hereinafter referred to as an ISP modem) and a computer system 60. The access controller 56 is preferably coupled to the ISP modem 58 via a digital TDM-like interface (or an analog metallic wire interface) and performs identical functions as the access controller 14 described above. In the upstream direction, the ISP modem 58 converts the digital computer information into v.34, v.34+, v.42, v.90 or any other applicable communications protocol information. In the downstream direction, the ISP modem 58 converts v.34, v.42, v.90 or any other applicable standard protocol information to digital computer information.

For ease of explanation, the preferred embodiment of the present invention is primarily concerned with how the downstream information is handled, and as a result, the specification will primarily discuss the downstream information flow even though the present invention is applicable to the upstream information as well. In operation, when a subscriber makes a call via the telephone 50 or the computer 54, the subscriber modem 52 acts like a standard telephone that goes off-hook, waits for a dial tone from the LDS 12 and dials a telephone number to make a connection to the ISP 20. The LDS 12 establishes a connection between the ISP modem 58 and the subscriber modem 52. After the subscriber modem 52 send the telephone number to the LDS 12, the subscriber modem 52 disconnects the telephone function and acts like a modem transceiver. The subscriber modem 52 then waits for the ISP modem 58 to initiate modem training sequences defined by the various communication protocols at the ISP 20 that are selected during a modem training sequence.

During the modem training sequence, the ISP modem 58 and the subscriber modem 52 detect channel impairments and set the communication protocol and effective bit transfer rate based on the number and types of impairments detected on the channel. One impairment is the network invoked robbed-bit signaling (RBS) noise. For ease of clarification, the preferred embodiment of the present invention focuses on RBS noise sources in the downstream direction even though the present invention can be configured to focus on any other noise source on the channel.

In the simple case of one RBS noise source, the subscriber modem 52 perceives the RBS as a residual low-speed noise pattern. Any network element may generate an independent in-band signaling noise pattern across each transport medium. For purposes of this discussion and ease of explanation, the one RBS noise source is generated between the LDS 12 and the access controller 14.

The residual RBS noise pattern consists of a repeating 4-bit signaling pattern (hereinafter referred to as a RBS noise pattern) for the 64 kbps traffic channel connection in the downstream direction. In the downstream direction between the LDS 12 and the access controller 14, at least one RBS noise pattern is present in every digital circuit-switched connection using GR-303 or TR-008 interface protocols. The RBS noise pattern reflects the steady-state connection status of the 64 kbps traffic channel over the transport medium between the LDS 12 and the access controller 14. A telephony network can generate multiple RBS noise patterns within a single 64 kbps traffic channel. Each RBS noise pattern is seen by the subscriber modem 52 as an independent noise source that causes performance degradation to the end-to-end modem connection.

The number of RBS noise patterns between an end-to-end modem connection varies on a call-by-call basis. The number of RBS noise patterns in a circuit-switched connection depends on the telephony network configuration used to establish the call. It should be noted that during a call, the RBS noise characteristics could dynamically change. For example, when the LDS transfers the established call circuit path from a primary transport medium 22 to an alternate transport medium 23. Thus, when the access controller 14 detects that in-band signaling pattern moved from a first location to a second location (e.g., due to a break in the primary transport medium 22 and transmission on the alternate transport medium 23)), the RBS mitigator disables the mitigating function (described below) for the first location and enables the mitigation function for the second location.

The preferred embodiment of the present invention mitigates (minimizes) the in-band noise introduced by the residual RBS noise pattern. In general, according to the preferred embodiment of the present invention, a network element performs a mitigating function: receives a traffic data stream having an embedded in-band signaling pattern. The network element synchronizes to the traffic data stream (e.g., via phase-locking, external timing reference, etc.) and detects a location or position in time of the in-band signaling pattern. The network element then replaces the in-band signaling pattern with a noise-mitigating signaling pattern. The noise-mitigating signaling pattern is a steady-state pattern, preferably a repeating ones pattern ("1111"), however, it could be a repeating zeros pattern ("0000"), a provisioned steady-state pattern or any other noise-mitigating signaling pattern which improves the communications protocol transfer characteristics as measured by the subscriber modem 52. The term "provisioned" is defined as an external control function that sets the parameters and/or conditions of operation.

Figure 3:
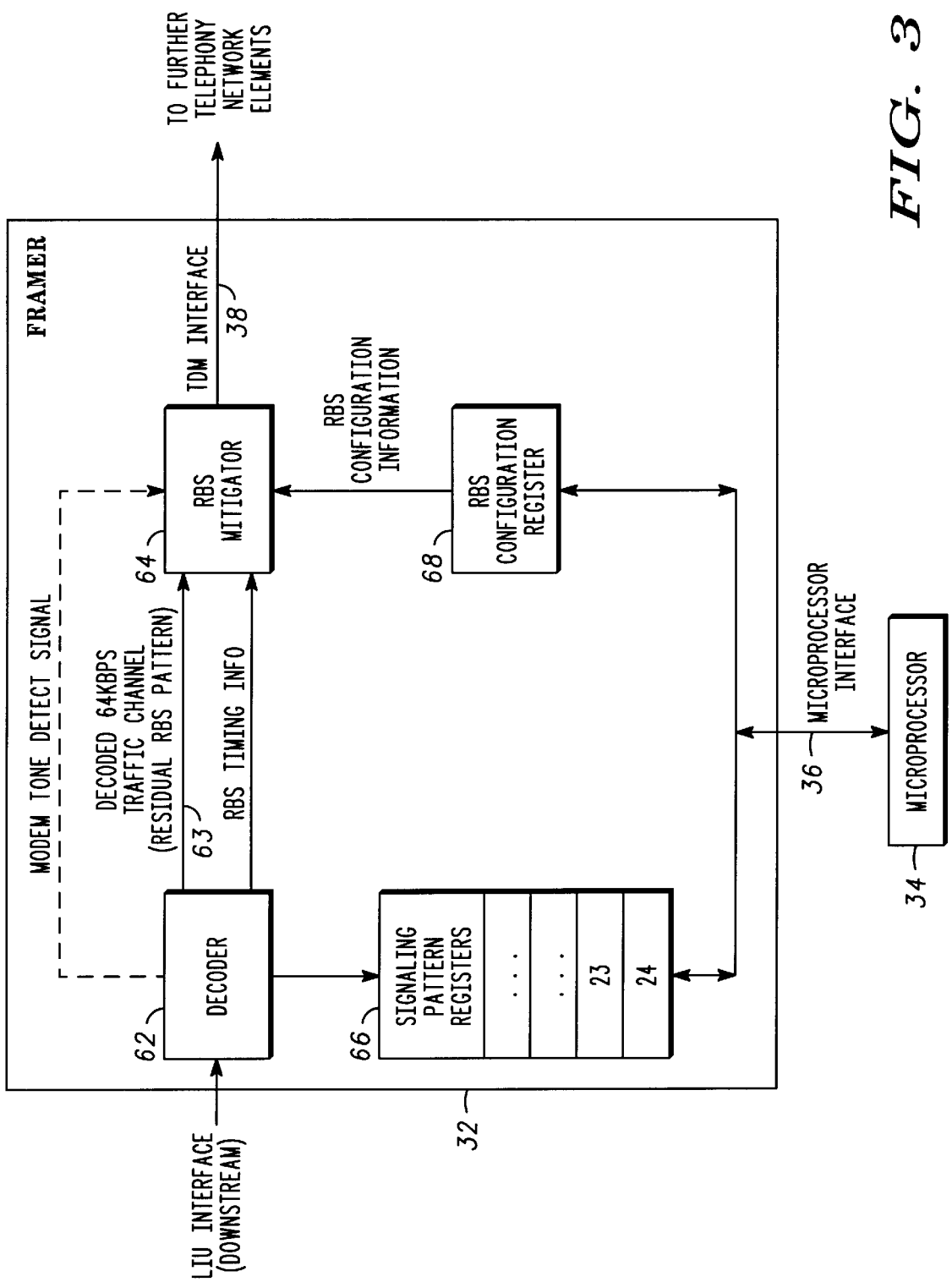
FIG. 3 illustrates an exploded view of a framer located in a network element in accordance with the preferred embodiment of the present invention.

To further elaborate on the details of the mitigating function, FIG. 3 illustrates an exploded view of the framer 32 located in the access controller 14 in accordance with the preferred embodiment of the present invention in the downstream direction. As shown in FIG. 3, the framer 32 comprises a decoder 62, a RBS mitigator 64, a signaling pattern registers 66 and a RBS configuration register 68.

Figure 4:
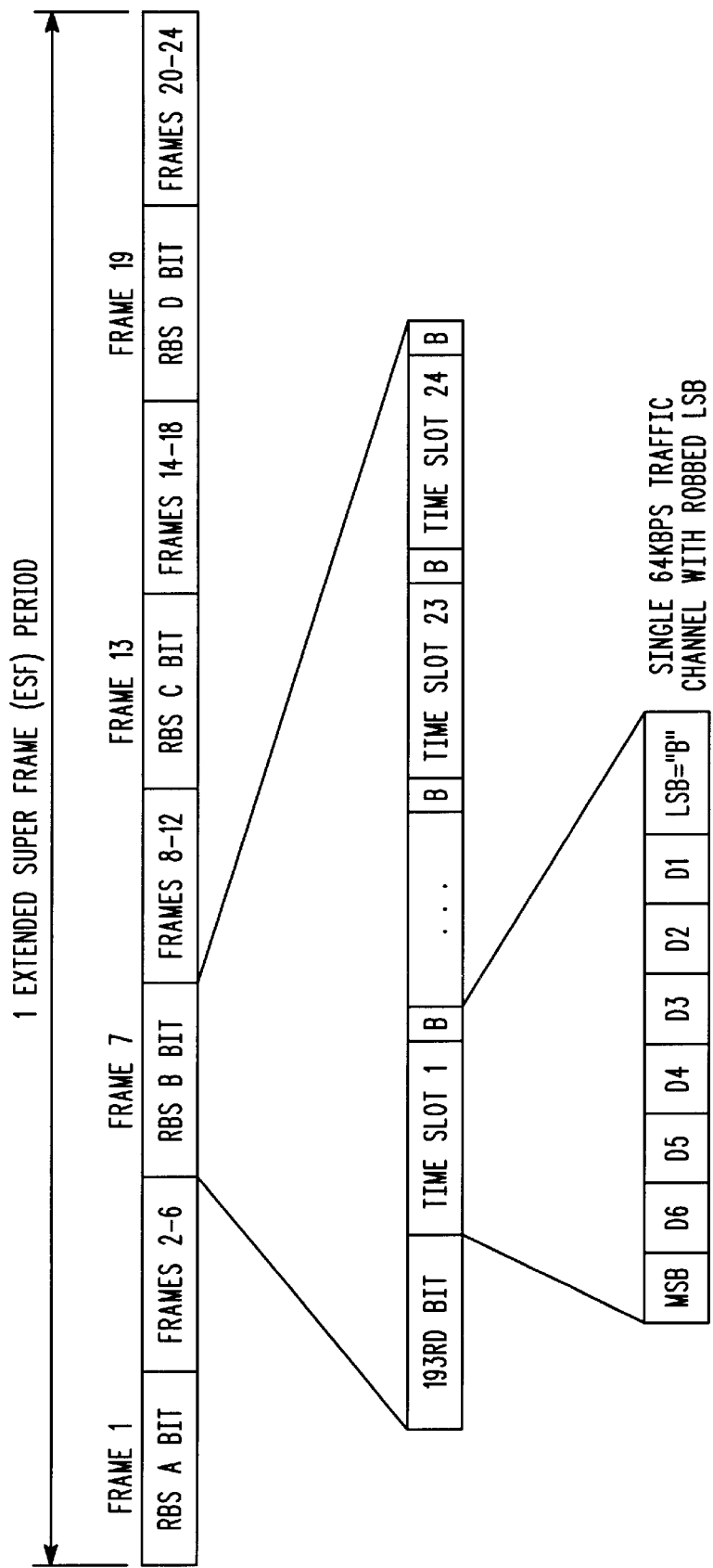
FIG. 4 illustrates a T1 ESF robbed-bit frame structure in accordance with the preferred embodiment of the present invention.

The decoder 62 receives recovered clock and data from the LIU interface 31 in the downstream direction. The received data is framed in an ESF format. As illustrated in FIG. 4, the T1 link format includes grouping twenty-four T1 frames to create an "extended super frame" (ESF). The ESF creates four RBS bits for each of the twenty-four 64 kbps traffic channels (traffic data streams) every twenty-four T1 frames, designated as A, B, C and D in FIG. 4. The ESF applies to North America T1 digital switch interfaces, such as GR-303 and TR-008 interface protocols.

A T1 framing structure multiplexes twenty-four 64 kbps time slots onto a 1.544 Mbps serial link, wherein each T1 frame repeats every 125 µs. The ESF consists of twenty-four T1 frames (193-bits) grouped together. Of the 193-bits, 192-bits carry twenty-four 64 kbps traffic channels (8-bits× 8000 per second=64 kbps). The 193$^{rd}$ bit consists of a 2 kbps framing/synchronization pattern, a 2 kbps error detection pattern and a 4 kbps data link. The 193$^{rd}$ bit is sampled across the twenty-four T1 frames, and thus carries with it RBS timing information.

Embedded in each 64 kbps traffic channel (traffic data stream) is a 4-bit RBS noise pattern (ABCD). With respect to a single 64 kbps traffic channel, this 4-bit RBS noise pattern robs 1-bit (the least significant bit (LSB)) from every sixth T1 frame (e.g., frame 1, frame 7, frame 13 and frame 19). The 4-bit RBS noise pattern represents signaling information sent from the LDS 12 to the access controller 14 and occurs simultaneously to all twenty-four 64 kbps traffic channels.

Using the $193^{rd}$ bit, the decoder 62 aligns itself to the ESF of the incoming data stream. Using the RBS timing information derived from the $193^{rd}$ bit, the decoder 62 reads the unique 4-bit RBS noise pattern from each of the twenty-four 64 kbps traffic channels and individually stores this information in twenty-four addressable registers 66. Each register 66 uniquely represents a 64 kbps channel. The microprocessor 34 accesses these addressable registers 66 through the microprocessor interface 36. At this point, the RBS noise pattern becomes residual, but remains embedded in all twenty-four 64 kbps traffic channels 63.

The RBS mitigator 64 receives the twenty-four 64 kbps traffic channels from the decoder 62 (minus the $193^{rd}$ bit) and performs the mitigating function on each of the twenty-four 64 kbps traffic channels. Using the RBS timing information from the decoder 62, the RBS mitigator 64 replaces the RBS noise pattern with a noise-mitigating signaling pattern for all twenty-four 64 kbps traffic channels.

The noise-mitigating signaling pattern is preferably a steady-state signaling pattern of all ones ("1111"). Alternatively, the noise-mitigating signaling pattern could be all zeros ("0000") or any provisioned noise-mitigating signaling pattern which improves the communications protocol transfer characteristics as measured by the subscriber modem 52. Regardless of whether the noise-mitigating signaling pattern is steady-state or provisioned, the microprocessor 34 writes a 4-bit pattern into a portion of the RBS configuration register 68, and the RBS mitigator 64 uses the stored 4-bit pattern in this RBS configuration register 68 as the noise-mitigating signaling pattern, which subsequently replaces the RBS noise pattern. The RBS configuration register is either a separate component of the framer 32 (as shown in FIG. 4), or integrated within the RBS mitigator 64.

Alternatively, the mitigating function may be implemented in the subscriber modem, or any other telephony network element as long as the mitigating function is performed before the digital 64 kbps traffic channels are decoded from a communication protocol into digital computer information by the subscriber modem 52.

In the preferred embodiment of the present invention, the mitigating function described above, regardless of where performed, is always enabled for all 64 kbps traffic channels. The RBS mitigator function may be selectively enabled and disabled on an individual 64 kbps traffic channel basis. Enabling and disabling the mitigating function is preferably implemented in conjunction with the microprocessor 34 via the RBS configuration register 68 or as defined by an external management system on a per channel basis. The RBS mitigator 64 checks (or is alerted by) the RBS configuration register 68 prior to performing the mitigating function on any of the 64 kbps traffic channels.

Alternatively, the decoder 62, or the RBS mitigator 64 itself, can selectively enable and disable the mitigating function based on modem training tones or digital impairment learning (DIL) detection, voice recognition detection, or any other detectable traffic channel characteristic that requires the mitigating function to be disabled, for each of the 64 kbps traffic channels. The use of modem training tones or DIL detection supports subscriber modems, voice links, video links or other data links to be selectively processed based on the service being supported. This disabling technique of the present invention may also be used for future technology developments where in-band signaling pattern may cause undesired degradation in services supported by the newer technology.

After the RBS mitigator 64 replaces the residual RBS noise pattern on all twenty-four 64 kbps traffic channels, these traffic channels are sent to the TDM interface 38. The TDM interface 38 further routes the twenty-four 64 kbps traffic channels to the remaining telephony network elements. When the subscriber modem 52 receives its 64 kbps traffic channel information with the noise-mitigating signaling pattern, the communication protocol is able to easily detect and adapt to the noise-mitigating signaling pattern which enables connection at a higher data rate while maintaining a lower bit error rate (BER) and/or block error rate (BLER) and a higher degree of consistency for the duration of the call. This improved modem performance is due to the elimination of the non-deterministic embedded noise effect of the RBS noise pattern by introducing deterministic channel impairments that are more detectable by the subscriber modem 52.

Figure 5:
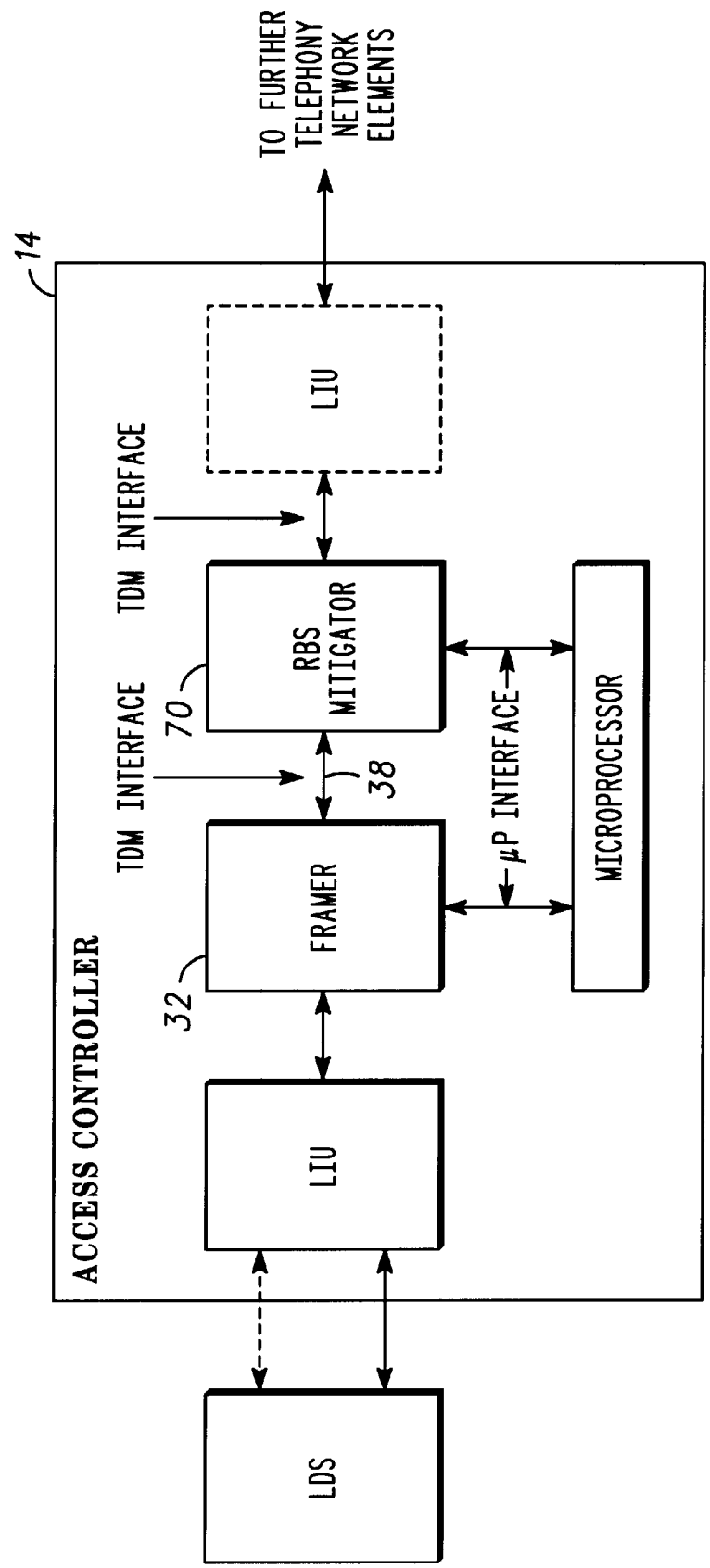
FIG. 5 illustrates a block diagram showing an independent robbed-bit signaling (RBS) mitigator in accordance with a first alternative embodiment of the present invention.

FIG. 5 illustrates a block diagram showing an independent RBS mitigator 70 in accordance with an alternative embodiment of the present invention. The independent RBS mitigator 70 is a separate telephony network element that can reside within the access controller 14 (as shown in FIG. 5) or external to the access controller 14 in series with the downstream traffic channel path. The independent RBS mitigator 70 receives twenty-four 64 kbps traffic channels from the framer 32 via the TDM interface 38. Each 64 kbps traffic channels contain embedded residual 4-bit RBS noise patterns. The independent RBS mitigator 70 synchronizes to the incoming data stream and replaces each of the 4-bit RBS noise pattern with a 4-bit noise-mitigating signaling pattern. This replacement of patterns is applied to all twenty-four 64 kbps traffic channels. Thus, the independent RBS mitigator 70 is configured to perform the same functions as the RBS mitigator 64 embedded in the framer 32 (or access controller 14).

Figure 6:
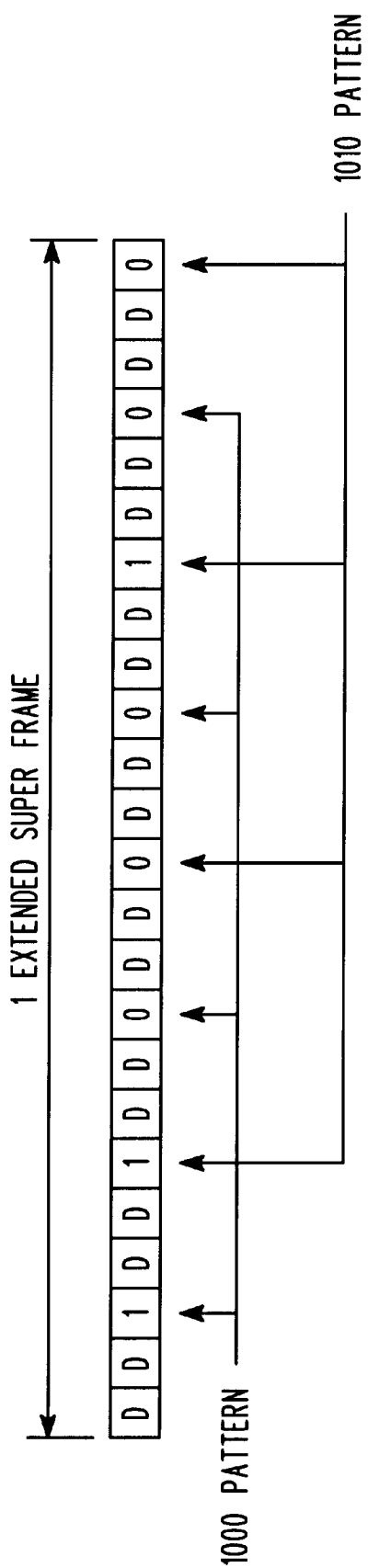
FIG. 6 illustrates a series of least significant bit samples showing two RBS noise patterns in accordance with a second alternative embodiment of the present invention.

Up to this point, the above description has focused on a telephony network where only one RBS noise pattern is present in the traffic data stream (64 kbps traffic channel) in the downstream direction. The present invention is also applicable when the traffic data stream comprises a plurality of embedded in-band signaling patterns in the downstream direction, each of which are uniquely detected and replaced according to the preferred embodiment of the present invention. FIG. 6 illustrates twenty-four LSBs that are derived from twenty-four contiguous T1 frames for a single 64 kbps traffic channel. Two independent RBS noise patterns are embedded within the twenty-four LSBs samples.

Figure 7:
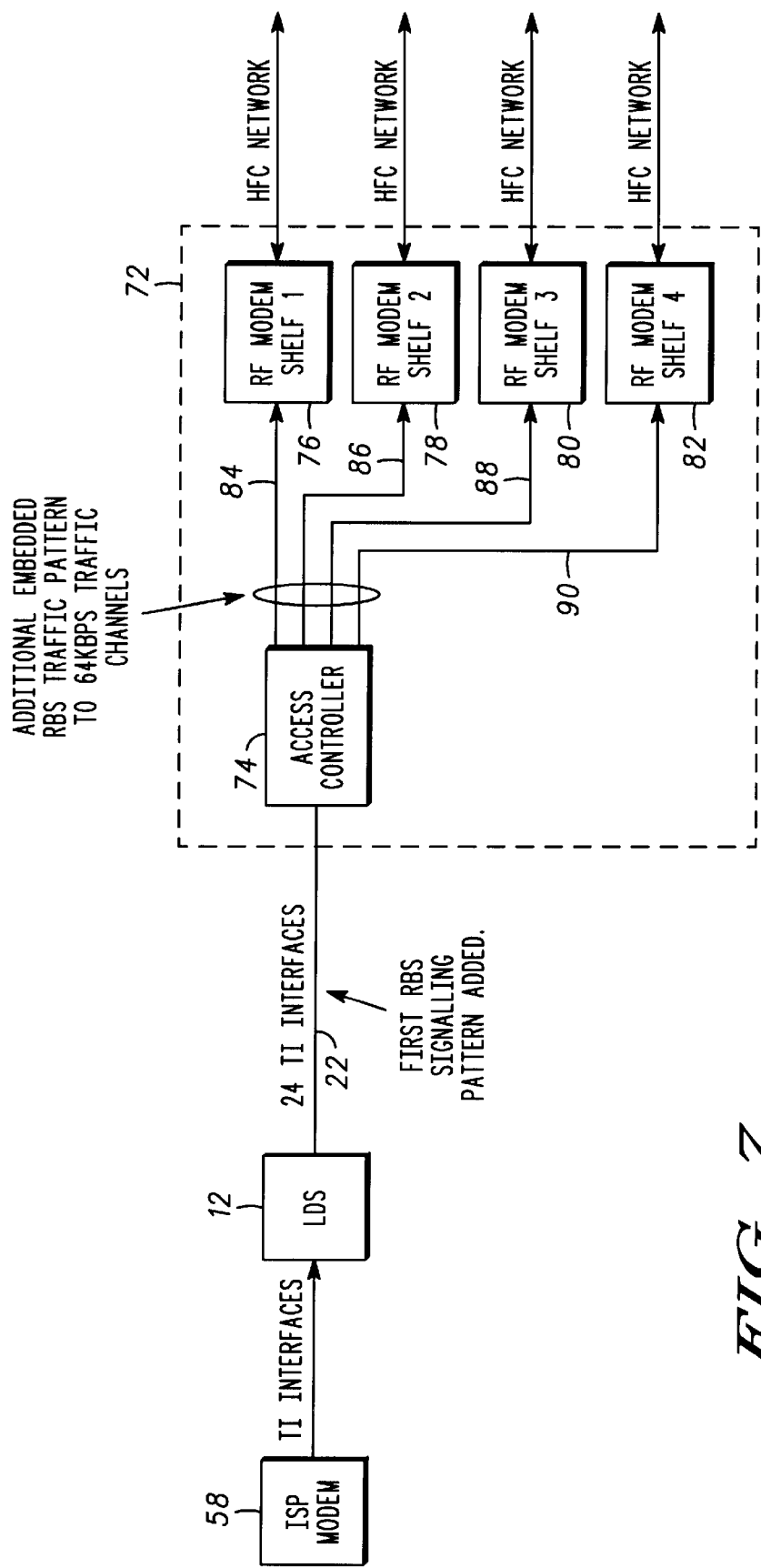
FIG. 7 illustrates a block diagram of a specific example generating two RBS noise patterns in accordance with the second alternative embodiment.

For illustration purposes only, FIG. 7 illustrates an example of a telephony network where more than one RBS noise pattern is present. As shown in FIG. 7, cable television (CATV) communication equipment 72 (such as Motorola's CableComm equipment) is added to the telephony network as a further telephony network element. As shown in FIG. 7, the CATV communication equipment 72 comprises an access controller and a plurality of independent radio frequency (RF) modem shelves 76, 78, 80, 82. The access controller 74 supports twenty-four T1 interfaces and communicates with four independent RF modem shelves 76, 78, 80, 82. Each RF modem shelf contains a proprietary access controller that functions identically to the access controller described in detail above. Each RF modem shelf also contains a plurality of RF modems. Each RF modem transfers eight 64 kbps traffic channels over a HFC network interface using the CATV communication equipment 72. The transport medium 22 between the LDS 12 and the CATV communication equipment 72 embeds a first RBS noise pattern in the twenty-four 64 kbps traffic channels. The interfaces 84, 86, 88, 90 between the access controller 74 and each RF modem shelf 76, 78, 80, 82 collectively embeds a second independent RBS noise pattern in the twenty-four 64 kbps traffic channels.

Figure 8:
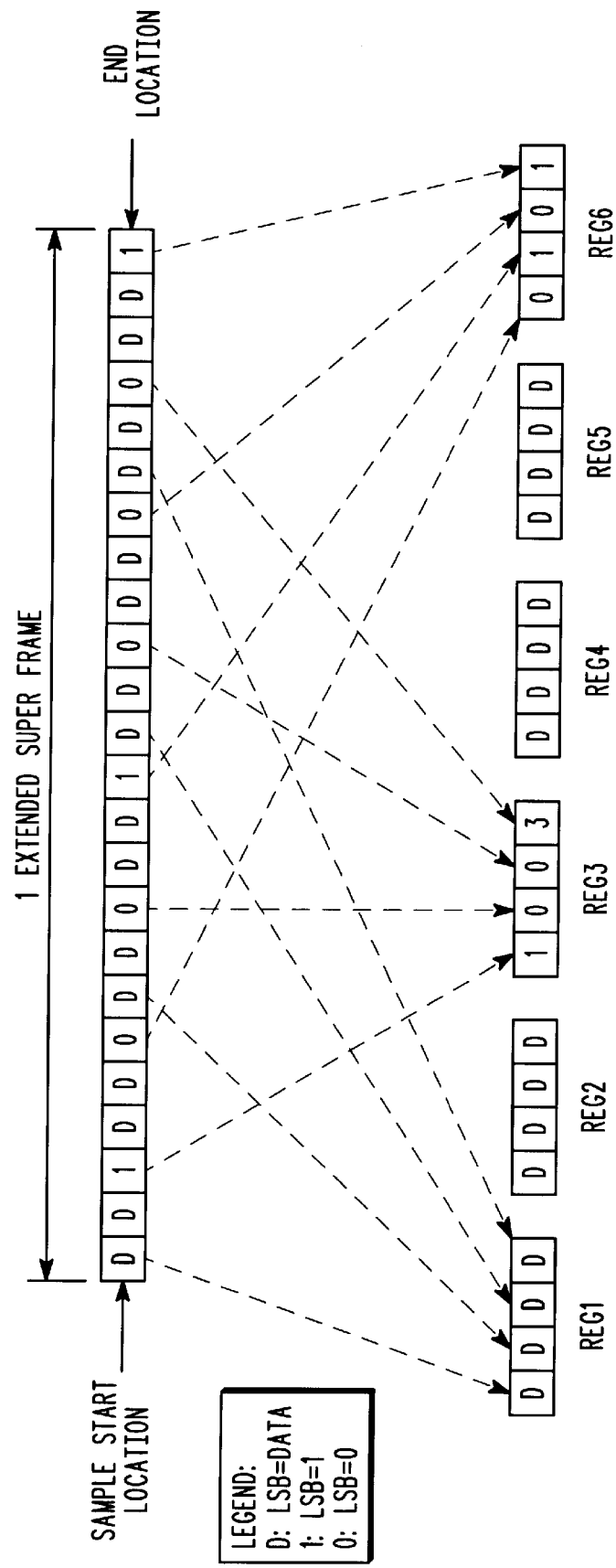
FIG. 8 illustrates an example of FIG. 6 using basic 4-bit storage registers in accordance with the second alternative embodiment.

FIG. 8 depicts a universal procedure of gathering up to six independent RBS noise patterns in accordance with the preferred embodiment of the present invention. This universal procedure, implemented in hardware or software, gathers the RBS noise patterns by sampling every sixth LSB. As shown, register 1 begins by storing the first LSB sample and subsequently stores every sixth LSB sample, thus resulting in a first unique 4-bit RBS noise pattern derived from LSB samples 1, 7, 13 and 19. This sequence is repeated for the remaining five registers. For example, register 2 begins by storing the second LSB sample from the beginning and subsequently storing every sixth LSB sample, thus resulting in a second unique 4-bit RBS noise pattern derived from LSB samples 2, 8, 14, and 20. Register 3 begins by storing the third LSB sample, etc. As a result, this universal procedure of the preferred embodiment of the present invention recovers six unique RBS noise patterns from within the twenty-four LSB samples.

Once the RBS mitigator 64 gathers all of the unique RBS noise patterns present in the 64 kbps traffic channels, it compares each pattern against a known set of RBS noise patterns. This known set of RBS noise patterns consist of all binary combinations of 4-bits which include, but not necessary limited to, the following: "0000", "0101", "1010", "1000", "0100", "0010" and "0001". If any of these patterns match any of the six stored RBS noise patterns, the stored RBS noise pattern position is replaced with a noise-mitigating signaling pattern, preferably all ones, but may also be replaced with all zeros or any other noise-mitigating signaling pattern which improves the communications protocol transfer characteristics as measured by the subscriber modem 52. This procedure is repeated every ESF for the duration of the end-to-end modem connection.

Alternatively, after the framer receives the traffic data stream (i.e., 64 kbps traffic channel) having the embedded in-band signaling pattern, it synchronizes to the traffic data stream. The RBS mitigator 64 replaces each LSB in the traffic data stream with a logical bit value ("1" or "0"). While this reduces the maximum theoretical channel capacity limit from 64 kbps to 56 kbps, the subscriber modem 52 will be able to consistently detect the RBS noise pattern (all of the LSB bits are set to the mitigation pattern) and establish more consistent connect rates with minimal BLER rates.

In a further embodiment, the access controller 14 receives a traffic data stream having an embedded in-band signaling pattern. The access controller synchronizes to the traffic data stream and detects the in-band signaling pattern based on the knowledge of the framing pattern and the placement of the in-band signaling pattern in the frame. At one of the termination points (either the LDS 12 or the access controller 14), the in-band signaling pattern and timing is known because it is used for control communication (not shown) between the termination points. Based on this a priori knowledge, the in-band signaling pattern is replaced with a noise-mitigating signaling pattern (either at a pattern or bit level) before transmission to the next telephony network element in the network. The noise-mitigating signaling pattern is preferably a steady-state pattern: all ones, all zeroes or provisioned.

Since one (or both) of the termination points know the RBS noise pattern and its timing, it is simple for the RBS mitigator 64, 70 to replace the RBS noise pattern to a noise-mitigating signaling pattern.

In a further embodiment, the access controller 14 detects the RBS noise pattern in a network link based on a provisioned pattern of the link framing pattern(s) and the placement of the RBS noise pattern in the frame. Based on this knowledge, the RBS mitigator 64, 70 replaces the RBS noise pattern with a provisioned noise-mitigating signaling pattern before transmission to the next telephony network element.

While the invention has been described in conjunction with a specific embodiment thereof (in particular, circuit-switched telephony networks), additional advantages and modifications will readily occur to those skilled in the art. For example, the present invention is applicable in "voice over an internet protocol (VoIP) telephony networks. In a VoIP telephony network, the access controller serves as a gateway function and the LDS 12 replaced with a public switched telephone network. The gateway function translates between an Internet Protocol (IP) network and a circuit-switched network (e.g., a public switched telephone network (PSTN)).

Thus, the gateway function is a translation point on the telephony network that translates IP network transmission formats, communications procedures, and audio/video transcoding formats into PSTN network equivalents. The gateway supports real-time communication (voice and data communications) between a first endpoint located on a circuit-switched network and a second endpoint located on an IP network. The invention, in its broader aspects, is therefore not limited to the specific details, representative apparatus, and illustrative examples shown and described.

Various alterations, modifications and variations will be apparent to those skilled in the art in light of the foregoing description. For example, a storage medium could be implemented in a network element, having stored thereon a set of instruction, which when loaded into a microprocessor, causes the microprocessor to perform the mitigating function: receive a traffic data stream having an embedded in-band signaling pattern; synchronize to the traffic data stream, detect a location of the embedded in-band signaling pattern and replace the embedded in-band signaling pattern with a noise-mitigating signaling pattern. Thus, it should be understood that the invention is not limited by the foregoing description, but embraces all such alterations, modifications and variations in accordance with the spirit and scope of the appended claims.

We claim:

1. A method for mitigating in-band signaling noise comprising:
    receiving a traffic data stream having an embedded in-band signaling pattern;
    detecting a first location of the in-band signaling pattern; and
    replacing the in-band signaling pattern with a noise-mitigating signaling pattern in the first location.

2. A method in accordance with claim 1 wherein the noise-mitigating signaling pattern is a steady-state pattern.

3. A method in accordance with claim 2 wherein the steady-state pattern is comprised of all ones.

4. A method in accordance with claim 2 wherein the steady-state pattern is comprised of all zeros.

5. A method in accordance with claim 1 wherein the noise-mitigating signaling pattern is a provisioned steady-state pattern.

6. A method in accordance with claim 1 wherein the in-band signaling pattern is a robbed-bit signaling pattern.

7. A method in accordance with claim 1 wherein the step of detecting is based on a priori knowledge of an in-band signaling bit position at a first time and a replacement by a corresponding bit value in the noise-mitigating signaling pattern at the first time.

8. A method in accordance with claim 1 wherein the traffic data stream comprises a plurality of traffic channels, and further comprising utilizing a voice recognition system to enable and disable the step of replacing the in-band signaling pattern with a noise-mitigating signaling pattern.

9. A method in accordance with claim 1 wherein the traffic data stream comprises a plurality of traffic channels, and further comprising utilizing a digital impairment learning process to enable and disable the step of replacing the in-band signaling pattern with a noise-mitigating signaling pattern.

10. A method in accordance with claim 1 wherein the traffic data stream comprises a plurality if traffic channels, and further comprising utilizing an external management system to enable and disable the step of replacing the in-band signaling pattern with a noise-mitigating signaling pattern.

11. A method in accordance with claim 1 wherein the traffic data stream comprises a plurality of traffic channels, and further comprising utilizing a modem training tone to enable and disable the step of replacing the in-band signaling pattern with a noise-mitigating signaling pattern.

12. A method in accordance to claim 1 further comprising supporting voice communications between a first endpoint located on a circuit-switched network and a second endpoint located on an internet protocol network.

13. A method in accordance to claim 1 further comprising:
    detecting a loss of the in-band signaling pattern in the first location;
    detecting the in-band signaling pattern in a second location;
    disabling the step of replacing; and
    replacing the in-band signaling pattern with the noise-mitigating signaling pattern in the second location.

14. A method in accordance to claim 1 wherein the traffic data stream comprises a plurality of embedded in-band signaling pattern, each of which are uniquely detected and replaced.

15. A network element for mitigating in-band signaling noise by receiving a traffic data stream having an embedded in-band signaling pattern, detecting a location of the embedded in-band signaling pattern and replacing the embedded in-band signaling pattern with a noise-mitigating signaling pattern.

16. A network element in accordance with claim 15 wherein the network element is coupled to a digital switch via a first transport medium, and wherein the digital switch transmits the traffic data stream across the transport medium to the network element.

17. A network element in accordance with claim 16 wherein the transport medium has a wireless interface to the network element.

18. A network element in accordance with claim 16 wherein the transport medium has a fiber optic interface to the network element.

19. A network element in accordance with claim 16 wherein the transport medium has a coaxial cable interface to the network element.

20. A network element in accordance with claim 16 wherein the transport medium has a metallic interface to the network element.

21. A network element in accordance with claim 16 wherein the network element and the digital switch are compliant to a GR-303 interface protocol standard.

22. A network element in accordance with claim 16 wherein the network element and the digital switch are compliant to a TR-008 interface protocol standard.

23. A network element in accordance with claim 16 wherein the network element is further coupled to a subscriber modem via a second transport medium, and wherein the network element replaces the embedded in-band signaling pattern with the noise-mitigating signaling pattern prior to the traffic data stream being decoded from a communication protocol into digital computer information by the subscriber modem.

24. A network element in accordance with claim 15 wherein the network element is embedded in a subscriber modem.

25. A network element in accordance with claim 15 wherein the noise-mitigating signaling pattern is a steady-state pattern.

26. A network element in accordance with claim 25 wherein the steady-state pattern is comprised of all ones.

27. A network element in accordance with claim 25 wherein the steady-state pattern is comprised of all zeros.

28. A network element in accordance with claim 25 wherein the noise-mitigating signaling pattern is a provisioned steady-state pattern.

29. A network element in accordance with claim 15 wherein the embedded in-band signaling pattern is a robbed-bit signaling pattern.

30. A network element in accordance with claim 15 wherein the network element serves as a gateway function for supporting voice communications between a circuit-switched network and an internet protocol network.

31. A system for mitigating in-band signaling noise comprising:
    a digital switch for transmitting a traffic data stream having an embedded in-band signaling pattern; and
    an access controller, coupled to the digital switch, for detecting a location of the embedded in-band signaling pattern and replacing the embedded in-band signaling pattern with a noise-mitigating signaling pattern.

32. A storage medium having stored thereon a set of instructions which, when loaded into a microprocessor, causes the microprocessor to perform the following functions:
    receive a traffic data stream having an embedded in-band signaling pattern;
    synchronize to the traffic data stream;
    detect a location of the embedded in-band signaling pattern; and
    replace the embedded in-band signaling pattern with a noise-mitigating signaling pattern.

33. A method for mitigating in-band signaling noise comprising:
    receiving a traffic data stream having an embedded in-band signaling pattern; and
    replacing each least significant bit sample in the traffic data stream with a logical bit value.

34. A method in accordance with claim 33 wherein the logical bit value is one.

35. A method in accordance with claim 33 wherein the logical bit value is zero.

* * * * *

UNITED STATES PATENT AND TRADEMARK OFFICE
CERTIFICATE OF CORRECTION

PATENT NO.     : 6,553,041 B1
DATED          : April 22, 2003
INVENTOR(S)    : Borneman, Jeffrey L. et al.

It is certified that error appears in the above-identified patent and that said Letters Patent is hereby corrected as shown below:

Column 12,
Line 50, delete "synchronize to the traffic data stream;"

Signed and Sealed this

Twenty-sixth Day of August, 2003

JAMES E. ROGAN
*Director of the United States Patent and Trademark Office*